(12) United States Patent
Hoekstra et al.

(10) Patent No.: US 6,222,953 B1
(45) Date of Patent: Apr. 24, 2001

(54) THERMO-OPTICAL SWITCH PROVIDED WITH A LATERALLY SHIFTED ELEMENT

(75) Inventors: Tsjerk Hans Hoekstra, Dieren (NL); Kornelis Propstra, Carleton Place (CA); Albert Borreman, Apeldoorn (NL)

(73) Assignee: JDS Uniphase Photonics C.V., Arnhem (NL)

( * ) Notice: Subject to any disclaimer, the term of this patent is extended or adjusted under 35 U.S.C. 154(b) by 0 days.

(21) Appl. No.: 09/360,058

(22) Filed: Jul. 23, 1999

Related U.S. Application Data

(63) Continuation of application No. PCT/EP98/00390, filed on Jan. 21, 1998.

(30) Foreign Application Priority Data

| Jan. 23, 1997 | (NL) | 1005071 |
| Mar. 3, 1997 | (NL) | 1005415 |
| Apr. 1, 1997 | (NL) | 1005071 |

(51) Int. Cl.$^7$ ................................................ G02B 6/35
(52) U.S. Cl. ................................................................ 385/16
(58) Field of Search .......................... 385/15–17, 27, 385/31, 39–42, 45, 51, 129–132

(56) References Cited

U.S. PATENT DOCUMENTS 5,623,566   4/1997   Lee et al. ................................ 385/24

FOREIGN PATENT DOCUMENTS

WO 97/22907   *   6/1997   (WO).

OTHER PUBLICATIONS

Hida et al., "Influence of humidity on transmission in a Y-brance thermo-optic switch composed of deuterated fluoromethacrylate polymer waveguides", Electronics Letters, Mar. 27, 1997, vol. 33, No. 7, pp. 626–627.*

Lipscomb et al., "Package thermo–optic polymer 1=2 switch", OFC 1995 Technical Digest, Paper WS10, pp. 221–220.*

Moosburger et al., "Digital optical switch based on 'oversized' polymer rib waveguides", Electronics Letters, Mar. 14, 1996, vol. 32, No. 6, pp. 544–545.*

* cited by examiner

Primary Examiner—Rodney Bovernick
Assistant Examiner—Michelle R. Connelly-Cushwa
(74) Attorney, Agent, or Firm—Dilworth & Barrese, LLP

(57) ABSTRACT

The invention pertains to a thermo-optical switch comprising at least one input channel, one output channel, one switching channel, and one heating element, where for at least part of the cross-sections of the switch the position of the heating element has been selected such that the difference in effective refractive index, in the switched state, between two of the output channels in said cross-section is at least 80% of the maximally attainable difference. As a result, the load on the switches can be reduced substantially, increasing their lifespan.

12 Claims, 3 Drawing Sheets

THERMO-OPTICAL SWITCH PROVIDED WITH A LATERALLY SHIFTED ELEMENT

This is a continuation of copending application Serial No. PCT/EP98/00390 filed Jan. 21, 1998.

BACKGROUND OF THE INVENTION

The invention pertains to a thermo-optical switch comprising at least one input channel, one output channel, two switching channels, and one heating element.

Such a switch is known from N. Keil, et al., "(2×2) digital optical switch realised by low cost polymer waveguide technology," *Electronics Letters*, Vol. 32, No. 16 (Aug. 1, 1996), 1470–1471. This article describes a thermo-optical switch which has four waveguides (or, more accurately, waveguide channels): two input ports and two output ports, and four electrodes (or, more generally, elements) for heating the waveguides. Switching a signal from one of the input ports to one of the output ports is effected via selective heating of the waveguides.

By so-called "switching channels" are meant those channels over which a temperature difference is induced, which difference results in switching. In the 2×2 switch described above the input and the output channels also serve as switching channels. In a Mach-Zehnder interferometer (MZI), which in its simplest form (e.g., as a 1×1 or 2×2 switch) is made up of one 3 dB splitter and one 3 dB combiner connected by two channels, a temperature difference is induced over these channels which, e.g. in the case of a 1×1 switch, results in a switching action. Hence, in an MZI these channels serve as switching channels.

Thermo-optical digital (mode evolution) switches, such as the very common 1×2 "Y-branched" switch, make it possible to switch signals from the input port to one of the output ports by heating just one of the output channels. In this way a temperature difference, and a difference in refractive index, is induced between the output channels. A signal launched in the input channel in the zero-ordered mode will adiabatically evolve to the local fundamental mode of the waveguide having the highest effective refractive index, $N_{eff}$. The effective refractive index difference between the two branches, $\Delta N_{eff}$, is responsible for the switching action and is proportional to the difference in effective temperature, $\Delta T_{eff}$ ($\Delta N_{eff} = c \cdot \Delta T_{eff}$ wherein "c" stands for the thermo-optical coefficient. "c" is negative for most polymers and positive for most inorganic materials). $T_{eff}$ is defined as the overlap between the normalised intensity profile of the local mode and the temperature profile induced by the heating element. The terms given above are known to the skilled person and do not require further elucidation.

In the case of polymeric adiabatic mode evolution switches the signal will propagate through the (comparatively) cool waveguide where the effective refractive index is highest.

Whether a switch is in the switched state may be dependent on the specifications of the switch or on the system of which the switch is part. For instance, in the case of a 1×2 switch, it may be necessary that after completion of the switching procedure less than 3% of the overall power of the outgoing signals passes through the output port which is qualified as being in the "off" state, while over 97% of the signal passes through the output port which is qualified as being in the "on" state. In the case of such a ratio the switch has to be able to attain an isolation of at least 15 dB (10 log 97/3).

It will be obvious that the term "switched" does not so much refer to an absolute physical state but rather indicates that the present switch meets the requirements (in this case especially the isolation) of the switched state. For instance, it may be that a switch will allow an isolation of 30 dB, while 18 dB suffices for a particular use. Generally speaking, 18 dB will be normative in that case.

FIG. 1 shows a top view of a 1×2 digital, planar thermo-optical mode evolution switch known in itself with one input channel (1), two output channels (2,3), and two resistive elements (4,5) for heating the output channels (2,3), which elements lie directly over the output channels, have the same width as the output channels, and are both provided with means to supply power (not shown here). The figure further shows that at the level where the two output channels (2,3) bifurcate (indicated by bisector B) the heating elements do not run directly above these channels but have been shifted in the lateral (transverse or X-) direction. This will result in a gradual, and hence adiabatic, setting in of the thermo-optical effect.

For clarity of the figure a substantially smaller scale has been chosen for the longitudinal or Z-direction than for the transverse or X-direction. In other words, there is question of a so-called "aspect ratio," which in this case is about 1:60 (X:Z) and which makes the switch appear much shorter than it actually is. The letter "S" indicates the separation between the centres of the output channels. The separation gradually increases in the longitudinal or Z-direction from the bifurcation.

To attain the switched state one of the resistive heating elements (4,5) is driven at a certain voltage, e.g., 5 Volt. This voltage is then kept constant in order to maintain the required temperature difference between the output channels, and thus the switched state. Hence there is a constant supply of heat to the switch. It is understood that even with regular switching (e.g., about once every 10 seconds) the total flow of heat to the switch will be more or less constant.

By reducing this power supply the lifespan of thermo-optical switches, which is restricted, int. al., by ageing of the optical material of which the switch is made, e.g., polymer, could be increased. Ageing is often attended with a change in the optical properties (in particular the refractive index) of the material, which may lead to the aforementioned isolation of the switch in the switched state being decreased, so that in time the switch will no longer be satisfactory and will have to be replaced. It also holds that a reduction of the supplied power will result in a lowering of the power density in the heating element (or heating elements), which benefits the lifespan and the reliability of both this element and the switch itself.

In addition, at a lower power the equipment driving the switch can have a less expensive design.

SUMMARY OF THE INVENTION

Hence for several reasons there is need for the power necessary for switching to be reduced. The invention has for its object to meet this need and other needs which will become apparent hereinbelow and achieves this as follows: in the thermo-optical switch described in the opening paragraph the position and/or the width of the heating element of the switch has been selected such for at least part, preferably at least 35% or even at least 50%, of the (xy) cross-sections (which comprise the heater), that the difference in effective refractive index, in the switched state, between two of the switching channels in said cross-section is at least 80%, preferably at least 85% or even at least 90%, of the maximally attainable difference.

DESCRIPTION OF THE PREFERRED EMBODIMENTS

Figure 1:
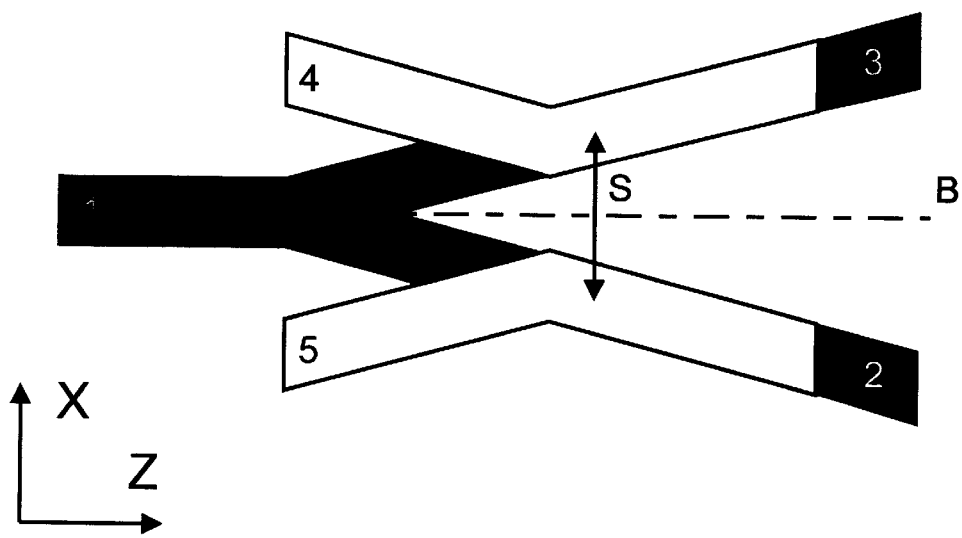
FIG. 1 illustrates a top view of a known switch.

It was found that the difference in effective refractive index between the switching channels (which difference will be indicated with $\Delta N_{eff}$) can be increased (compared to a switch as shown in FIG. 1 where the heaters lie directly over the output channels), while the power supplied remains the same, by determining the maximum difference in $T_{eff}$ (for a number of cross-sections) between the switching channels when varying the position of the heating element laterally (in the X- or transverse direction). Preferably, the width of said heating element is also varied. Thus, the design of the switch can be optimised by repeating the calculation procedure shown in FIG. 2 (where $n_{XY}(0)$ is the index profile in the cross-section at a temperature of the heater element which is equal to the temperature of the surroundings) for a number of lateral positions at a selected, constant width. Next, the calculation is repeated for the same number of lateral positions for a second selected width which is kept constant, and then again for further widths in turn. Thus, sufficient data is generated to form a matrix which gives $\Delta T_{eff}$ as a function of the lateral position and the width of the heater element. The optimal design, in terms of lateral position and width of the heater element, is that which exhibits the greatest value for $\Delta T_{eff}$.

The $\Delta N_{eff}$ minimally required to attain the switched state has of course remained unchanged, so that the increase in $\Delta N_{eff}$ by lateral shifting of the heating element makes it possible to reduce the supply of power until the original level of the minimally required $\Delta N_{eff}$ is once again attained.

Depending on the geometry of the thermo-optical switch and the materials from which it is made, the power supplied to the switches according to the invention can be reduced by about 25 to 50%, which results in an increased lifespan, greater reliability, and simpler peripheral equipment for the switch.

Figure 2:
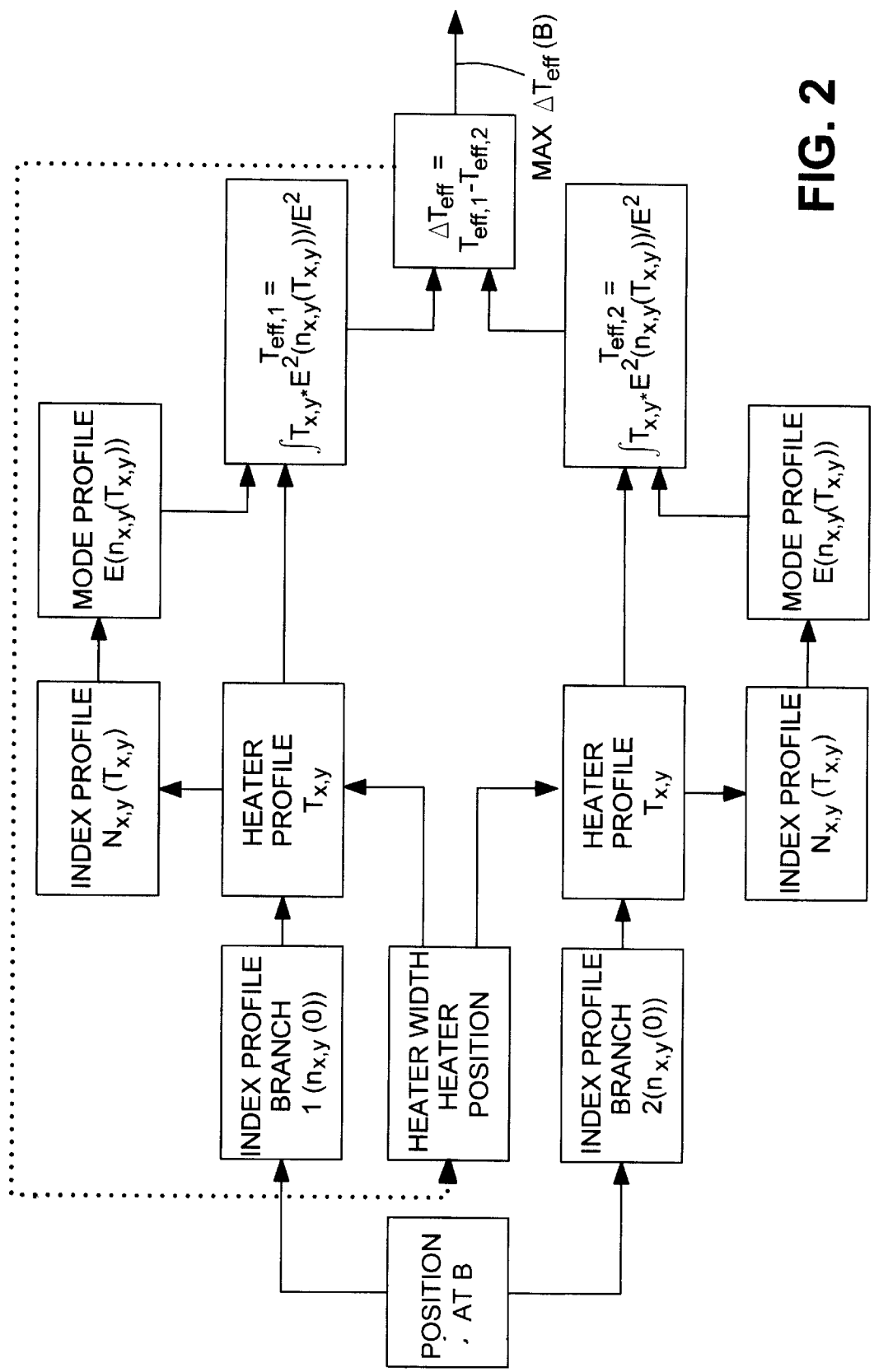
FIG. 2 schematically illustrates a calculation procedure for optimizing the inventive switch.

As explained above, the position of the heating elements can be optimised using $\Delta T_{eff}$ (calculation procedure according to FIG. 2). In switches which have a high mode confinement ($\geq 0.7$) in the channels of the waveguide the average temperature in (the cross-section of) a waveguide is a good approximation of $T_{eff}$.

In a preferred embodiment according to the invention the central line of the heating element extends at a distance in the range of 0.7 x(B) to 1.7 X(B) from the bisector between the two switching channels closest to the heating element over at least 30% of its length, with B determining the position on the bisector and X standing for the distance to the bisector, as a function of B, at which distance X the difference in effective temperature in the switched state between two of the output channels in the cross-section, $\Delta T_{eff}$, is maximal at the level of B.

Particular preference is given to thermo-optical switches where the central line of the heating element extends at a distance in the range of 0.75 X(B) to 1.4 X(B) from the bisector over at least 50% of its length.

In principle, said temperature profiles can be determined by measuring. However, preference is given to the use of numerical simulation, e.g., using the finite difference method (such as: Fimmwave™ or Selene™) or the finite elements method (such as: AnSYS™), since in this way very useful values can be obtained comparatively simply.

The optimum position of the heating element or elements is dependent, int. al., on the geometry (layer thicknesses, height and width of the waveguide channels, etc.) and the composition of the material (thermal conduction coefficient, refractive indices, etc.) of the thermo-optical switch, and hence will be (somewhat) different for each type of switch and have to be determined therefor. Although the isotherms shift with the changing temperature, at temperatures in the range of roughly 0° C. to 100° C. (for polymers) or 0° C. to 250° C. (for inorganic materials) the optimum position of the elements depends on the temperature hardly if at all.

In some cases the position is also dependent on the wavelength of the signal to be switched. The position can then be optimised for the wavelength or wavelength range in which the switch is to be used. Examples of such a wavelength are 1310 nm or 1550 nm.

The effect of the position of the heating elements is greatest in those places where there is comparatively high separation. Especially in those places where coupling occurs (when the separation usually is in the range of about 25% to about 75% of the value at which the interaction between the switching channels is negligible), this effect is substantial.

It was also found that, in general, advantageous use can be made of heating elements with a comparatively wide and thin cross-section, in other words, with a high width/thickness ratio. Because of the small height of such elements the adverse effects of "underetching" during manufacturing are limited. Underetching produces irregularities in the sides of the elements and also leads to the contact surface area between the element and the polymer package underneath it being reduced.

If the width/thickness ratio (the width in meters divided by the thickness in meters) exceeds 20, preferably 50 or even 70, the above-described phenomenon occurs (proportionally). The maximum value of this ratio is restricted mainly by the manner of application. For, sufficient homogeneity and uninterruptedness of the elements is guaranteed only at a certain thickness.

In a preferred embodiment the width of the input channel increases ahead of the junction or junctions in the output channels. Switches with a single input port in that case will have a so-called "taper" between the input channel and the switching channels. Because of this taper the light is coupled into the selected output channel without any unnecessary losses or disturbance of the fundamental or zero-order mode.

Preferably, use is made of planar and/or digital switches.

The invention further pertains to a thermo-optical switch comprising at least one input channel and three output channels, the switch comprising two or more, preferably three or four, heating elements at least two of which extend, in top view, on either side of the central axis of the switch and at a greater distance from it than the outer output channels.

In thermo-optical switches with three or more output channels it is hard to switch to any output channel which, in top view, extends between two other output channels because the output channels on either side of the intermediate output channel have to be heated, which means that a substantial effect (heating) on this intermediate channel is virtually unavoidable.

It has been found that by using more than two heating elements the switching efficiency can be improved substantially, and that the option of a configuration with three or more output ports, which was not feasible at all for many types of thermo-optical switches, is now a viable one.

Preference is given to the central line of at least one of the heating elements extending at a distance in the range of 0.7 X(B) to 1.7 X(B) from the bisector between the two output channels closest to the heating element over at least 35% of its length, with B determining the position on the bisector and X standing for the distance to the bisector, as a function of B, at which distance X the difference in effective temperature in the switched state between two of the output channels in the cross-section is maximal at the level of B.

Particular preference is given to thermo-optical switches where the central line of the heating element extends at a distance in the range of 0.75 X(B) to 1.4 X(B) from the bisector over at least 50% of its length.

The invention also pertains to a thermo-optical 1×3 switch in which three or four heating elements are utilised. The design of the configuration of the heating elements of a 1×3 switch ("ψ-junction") with four heating elements preferably first establishes the position of two of the four elements, with optimum $\Delta T_{eff}$ between the intermediate or middle channel and the two outer channels. Switching to this intermediate channel is done by energising these two heating elements.

Figure 3:
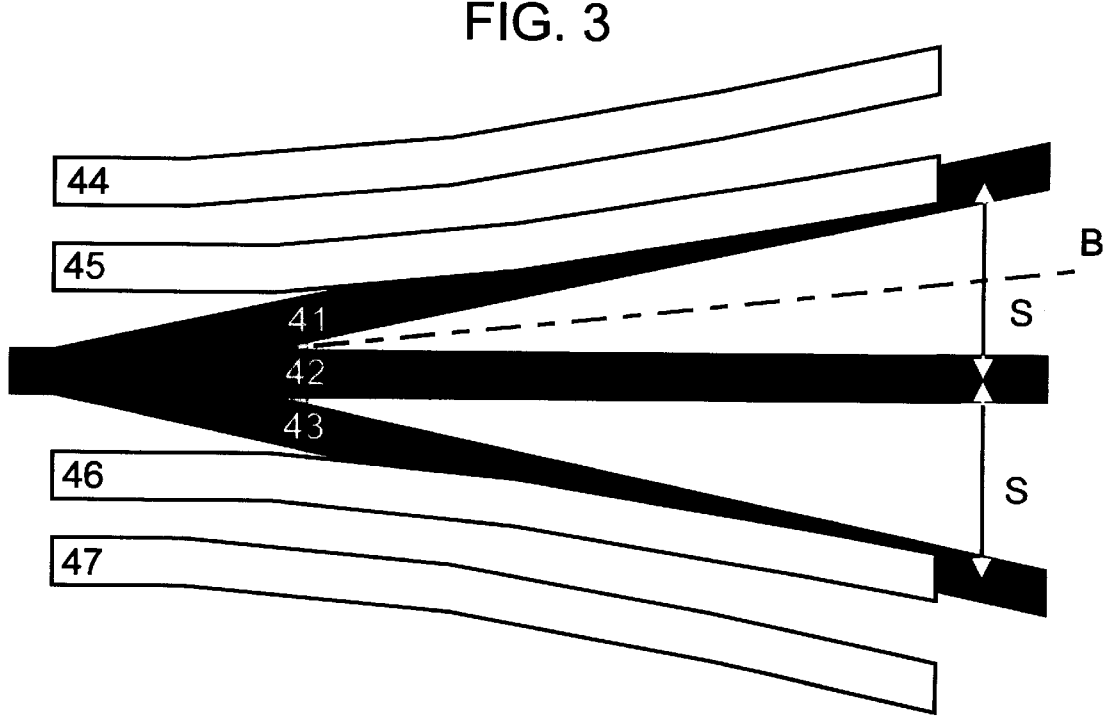
FIG. 3 illustrates a top view of the inventive switch.

FIG. 3 shows such a 1×3 switch provided with four heating elements (44, 45, 46, and 47). First, the position of the two outer elements (44 and 47) is optimised for $\Delta T_{eff}$ between the middle output port (42) and the left-hand and right-hand output ports (41 and 43, respectively). The value of $\Delta T_{eff}$ between the middle output port (42) and the left-hand output port (41) has to be (virtually) maximal, as well as (virtually) equal to $\Delta T_{eff}$ between the middle output port (42) and the right-hand output port (43).

Next, the position of the third heating element (45) is optimised to give maximum $\Delta T_{eff}$ between the middle output port (42) and the right-hand output port (43) on the one hand and the left-hand and right-hand output ports (41 and 43, respectively) on the other. In this calculation it may be taken into account that when switching to the right-hand output port (43), the element furthest to the left (44) is also energised. Support by this element (44) allows a lower temperature on the part of the third element (45), as a result of which local thermal load on the switch remains low and the current or power density is restricted.

This procedure for the third element (45) is repeated for the fourth element (46). In the case of a symmetric switch the position of the third element (45) is easily placed in mirror image relationship to the central axis (which will then coincide with the axis of symmetry).

A possible alternative to the above method, which is based on the local mode of each of the channels, is to calculate $\Delta T_{eff}$ using the system mode of two channels and the local mode of the remaining channel.

As an alternative or supplementary to the use of three or more heating elements in switches with three or more output channels, the geometry and the materials (and/or the treatment of said materials) of the switch can be selected such that the switch will already display a certain asymmetry or bias (preferably resulting in a difference of 3 dB or more over at least two of the output channels).

The benefit of this is readily illustrated with reference to, e.g., a 1×3 switch. As will be clear from the examples below, in such a switch more electrical power has to be supplied for switching to the middle channel (read, attaining the prescribed isolation thereof) than for switching to one of the outer channels. Having such a switch design as will result in a higher portion of optical power passing to the middle channel in the non-excited state than before means less electrical power is required to switch to the middle channel. The switch may be designed such that the electrical power required for each of the switched states is (about) the same. As a result of this peaks in the switch's thermal load will be reduced or cancelled out.

Suitable means and methods to effect said asymmetry or bias include adjusting the height or width of one or more channels, adjusting the refractive index of one or more channels (e.g., by means of burn in, that is to say, permanent alteration of the refractive index by (sustained) very high power supply, or serial grafting), adjusting the shape of the junction or the taper, or varying the position of the output channels vis-a-vis the input channel.

It should be noted that U.S. Pat. No. 4,753,505 discloses a thermo-optical switch comprising a heating element which has partially been shifted in the lateral (X-) direction. When the heating element is energised, a temperature profile is created in the switch, in which process in each of the cross-sections the light from the input channel is reflected at the position where the temperature gradient δT/δX is maximum and directed to the selected output channel.

This principle is fundamentally different from the one according to the invention, and the position of the heating element is much more critical in the switches according to U.S. Pat. No. 4,753,505. No mention is made of temperature differences between the output channels, and switches with more than two output ports cannot be realised with the technology specified by U.S. Pat. No. 4,753,505, or can be realised only with great difficulty.

M. Klein Koerkamp et al., "Design and fabrication of a pigtailed thermo-optic 1×2 switch," *Proceedings Integrated Photonics Research, OSA Technical Digest Series*, 3 (1994), 274–276, discloses a thermo-optical 1×2 switch (Y-junction) where the heating elements have undergone a lateral shift in the range extending from just ahead of the junction to just beyond the junction. This results in the thermo-optical effect setting in virtually adiabatically. In the area in which switching is attended to the elements run straight above the output channels. With the BPM (Beam Propagation Method) simulation used at the time it is not possible to make calculations with varying distances between the element and the output channel. Moreover, it is not possible to include the difference in temperature of the output channels in this simulation.

U.S. Pat. No. 4,070,092 relates to electro-optical switches where the electrodes have undergone a lateral shift vis-a-vis the output channels, also to make the setting in of the electro-optical effect less abrupt. Thermo-optical switches are mentioned only in passing.

According to this invention, the central axis (longitudinal or Z-axis) is defined as the imaginary line dividing up the angle between the two outer output channels into two equal angles. The transverse or X-direction is perpendicular to the central axis. The thickness or Y-direction is perpendicular to both the central axis and the X-direction. The term "central line of the heating element" concerns the line which divides the width of the element into two equal parts for each value of Z. If use is made of two (closely) adjacent elements which are energised simultaneously (as in the case of the described 1×3 switch), this term refers to the line located precisely between the central lines of the individual elements.

For completeness' sake it is noted that the invention covers N×M switches in which N and M are natural numbers (usually 4 or less).

For a detailed description of thermo-optical switches reference may be had to European patent applications 95200965.2, 95201460.3, 95201762.2 (construction of a layered package) and 95201761.4. Within the framework of the invention preference is given to polymeric (i.e., at least the core material and preferably the core and cladding materials are polymer materials) and/or digital and/or planar switches.

The invention will be further elucidated below with reference to the Following, unlimitative examples. In the examples the following figures are referred to:

FIG. 1 1×2 thermo-optical switch according to the prior art.

FIG. 2 Procedure to calculate $\Delta T_{eff}$ at a specific cross-section (i.e., for a specific value of B)

FIG. 3 1×3 thermo-optical switch according to the invention.

Figure 4:
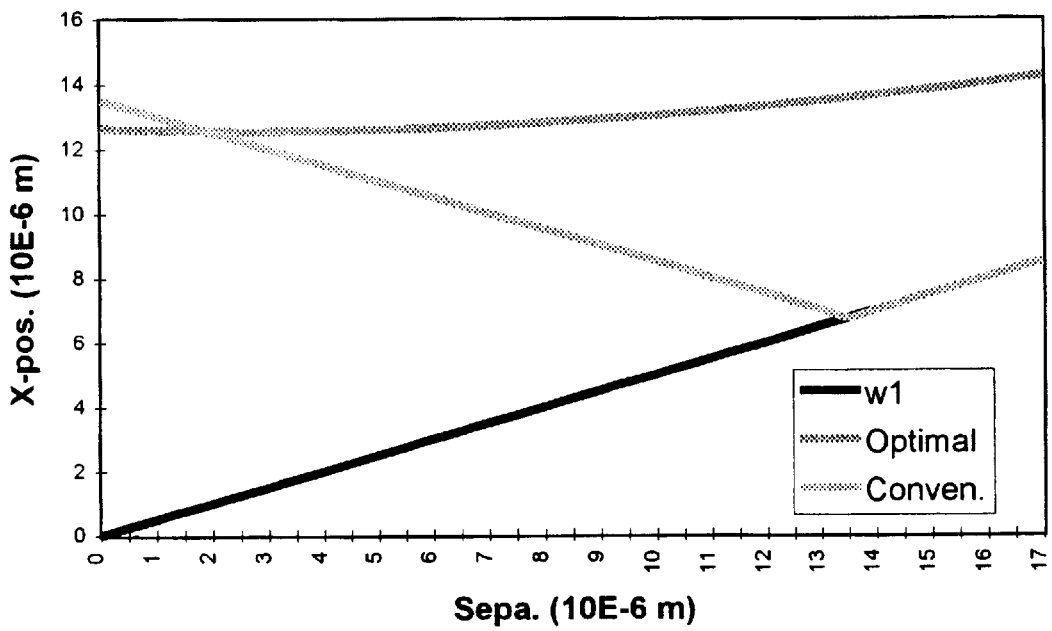
FIG. 4 is a graphical comparison of the invention over conventional feature.

FIG. 4 Configuration of output channels and heating elements in a 1×2 switch according to the invention and according to the prior art.

Figure 5:
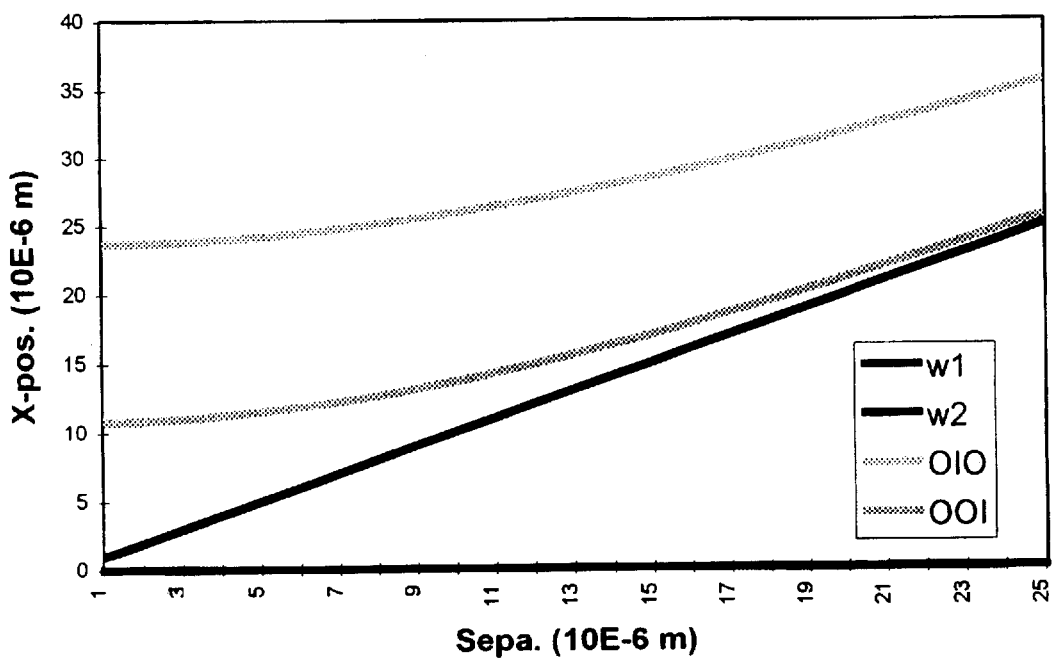
FIG. 5 is a graphical depiction of possible positions in accordance with the present invention.

FIG. 5 Configuration of output channels and heating elements in a 1×3 switch according to the invention.

EXAMPLE 1

In the form of a graph FIG. 4 depicts two possible positions, in top view, of the output channels and the heating elements in one half of a symmetric 1×2 switch. "W1" is the left-hand output channel of the switch, "Conven." stands for the conventional heating element position up to now (comparable with FIG. 1), and "Optimal" is the position in a switch according to the invention. Instead of the Z-value, the Z-axis indicates the separation.

Apart from the position and the length (according to the invention: 10 mm, comparative example: 11 mm) of the heating elements, the two 1×2 switches are identical. They are planar, digital switches composed of polymeric waveguides (width 6 μm) in a polymeric cladding on a silicon substrate. The total length of the switches is 10 mm. The heating elements (of Au) are 6 μm wide.

In the switches a signal with a wavelength of 1550 nm is coupled and switched to one of the two output channels. In Table 1 below the isolation attained is plotted against the power supplied.

TABLE 1

| Switch according to the invention | | Conventional switch | |
| --- | --- | --- | --- |
| Power (mWatt) | Isolation (dB) | Power (mWatt) | Isolation (dB) |
| 17.6 | 5.0 | 16.5 | 2.8 |
| 27.6 | 8.0 | 24.7 | 4.4 |
| 40.2 | 12.7 | 35.1 | 6.3 |
| 53.0 | 20.4 | 46.8 | 8.9 |
| 67.4 | 23.3 | 58.3 | 12.3 |

At an isolation ±12 dB the conventional switch uses up about 58 mWatt, while the switch according to the invention does not require more than 40 mWatt. The power required has been reduced by over 30%.

EXAMPLE 2

In the form of a graph FIG. 5 depicts the possible position, in top view, of the output channels and the heating elements in one half of a symmetric 1×3 switch. "W1" is the left-hand output channel of the switch and "W2" the middle output channel. "OIO" indicates the position of the element used in switching to the middle output port (42 in FIG. 3), "OOI" indicates the position of the element which (together with the "OIO" element) is used in switching to the right-hand output port (43 in FIG. 3).

This example likewise pertains to a planar, digital switch. The waveguides have a width of 6 μm, the length of the whole amounts to 15 mm. The separation at the level of the output ports is 23 μm.

In the switch a signal with a wavelength of 1550 nm is coupled and each time switched to one of the three output channels. In Table 2 below for each position of the switch (IOO: to the left-hand output port, OOI, to the right-hand output port; in each case the poorest value is given since it is normative; OIO to the middle output port, the isolation between the middle channel and the right-hand channel is the same as the isolation between the middle channel and the left-hand channel) the attained isolation is plotted against the total power consumed. Switching is effected by always driving two heating elements, as explained in the discussion of FIG. 3.

TABLE 2

| |OO/OO| | | O|O | |
| --- | --- | --- | --- |
| Power (mWatt) | Isolation (dB) | Power (mWatt) | Isolation (dB) |
| | | 92 | 10.0 |
| | | 120 | 12.5 |
| 46 | 15.0 | 156 | 15.0 |
| 61 | 17.5 | 181 | 17.5 |
| 73 | 20.0 | | |

These results show that using more than two elements makes it possible to construct a 1×3 switch with which effective switching can take place.

What is claimed is:

1. A thermo-optic switch comprising at least one input channel, one output channel, two switching channels, and one heating element, characterized in that for at least part of the cross sections of the switch the position and/or the width of the heating element has been selected such that the difference in effective refractive index, in the switched state, between two of the switching channels in said cross-section is at least 80% of the maximally attainable difference, and such that the central line of the heating element extends at a distance in the range of 0.7 X(B) to 1.7 X(B) from the bisector between the two switching channels closest to the heating element over at least 35% of the length of the heating element, with B determining the position on the bisector and X being the distance, in transverse direction to the bisector as a function of B, at which distance the difference in effective temperature in the switched state between two of the switching channels in the cross-section is maximal at the level of B.

2. A thermo-optical switch according to claim 1, characterised in that the central line of the heating element extends at a distance in the range of 0.75 X(B) to 1.4 X(B) from the bisector over at least 50% of the length of the heating element.

3. A thermo-optical switch according to claim 1, characterized in that the width of the heating element is greater than the width of the switching channels.

4. A thermo-optical switch according to claim 1, characterised in that the switch switches digitally.

5. A thermo-optical switch according to claim 1, characterised in that the switch is planar.

6. A thermo-optical switch comprising at least one input channel and three output channels, characterised in that the switch comprises two or more heating elements at least two of which are located, in top view, on either side of the outer output channels, with the distance between the central axis of the switch and the heating elements exceeding the distance between the central axis and the outer output channels.

7. A thermo-optic switch according to claim 6, characterised in that the central line of at least one of the heating elements extends at a distance in the range of 0.7 X(B) to 1.7 X(B) from the bisector between the two switching channels closest to the heating element over at least 35% of length of the heating element, with B determining the position on the bisector and X being the distance in transverse direction to the bisector as a function of B, at which distance the difference in effective temperature in the switched state between two of the switching channels in the cross-section is maximal at the level of B.

8. A thermal-optical switch according to claim 7, characterized in that the switch comprises one input port, three or four output ports and three or four heating elements.

9. A thermal-optical switch according to claim 7, characterized that in the middle output or ports are biased so that the power required for each of the switched states is substantially the same.

10. A thermo-optical switch according to claim 6, characterised in that the switch comprises one input port, three or four output ports, and three or four heating elements.

11. A thermal-optical switch according to claim 10, characterized that in the middle output or ports are biased so that the power required for each of the switched states is substantially the same.

12. A thermo-optical switch according to claim 6, characterised in that the middle output port or ports are biassed so that the power required for each of the switched states is substantially the same.

* * * * *